Jan. 1, 1929.　　　　　　　　　　　　　　　　　　　　　　　1,697,459
L. DOROGI ET AL
PROCESS OF PRODUCING INFLATABLE BODIES, FOR INSTANCE TOYS
OF FLAT RUBBER PLATES WITHOUT THE USE OF MOLDS
Filed Aug. 22, 1925　　　　　　　4 Sheets-Sheet 1

Inventors.
Lajos Dórogi
and István Dórogi
per /. Owalus
Attorney.

Jan. 1, 1929.                                                           1,697,459
                             L. DOROGI ET AL
        PROCESS OF PRODUCING INFLATABLE BODIES, FOR INSTANCE TOYS
             OF FLAT RUBBER PLATES WITHOUT THE USE OF MOLDS
                       Filed Aug. 22, 1925            4 Sheets-Sheet 2
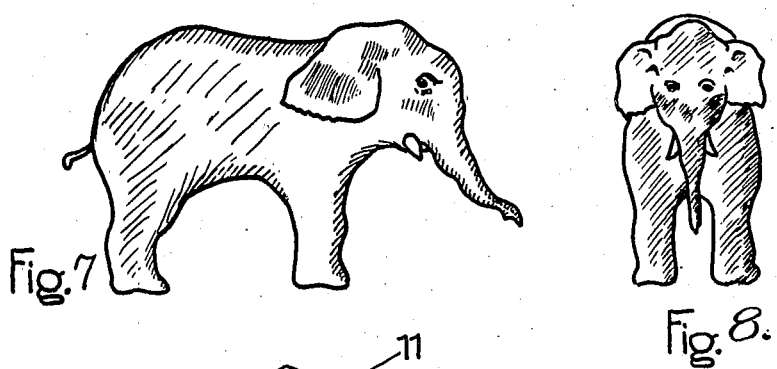
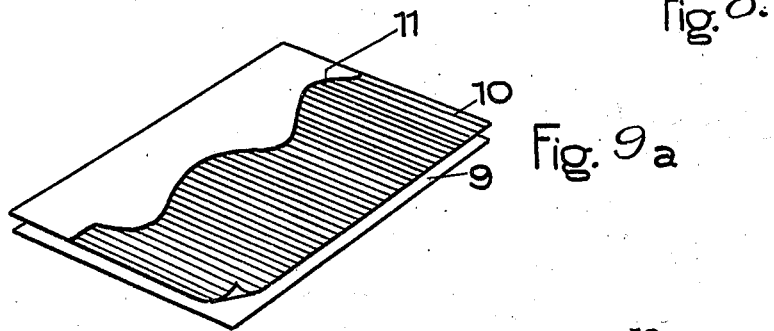
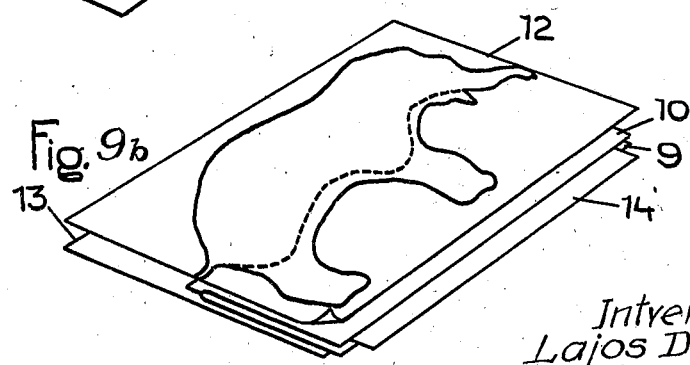
Inventors.
Lajos Dörogi.
and István Dörogi.
per
        Attorney.

Jan. 1, 1929.  1,697,459
L. DOROGI ET AL
PROCESS OF PRODUCING INFLATABLE BODIES, FOR INSTANCE TOYS
OF FLAT RUBBER PLATES WITHOUT THE USE OF MOLDS
Filed Aug. 22, 1925    4 Sheets-Sheet 3

Inventors
Lajos Dórogi
and István Dórogi
per
Attorney.

Patented Jan. 1, 1929.

1,697,459

UNITED STATES PATENT OFFICE.

LAJOS DOROGI AND ISTVAN DOROGI, OF BUDAPEST, HUNGARY.

PROCESS OF PRODUCING INFLATABLE BODIES, FOR INSTANCE TOYS, OF FLAT RUBBER PLATES WITHOUT THE USE OF MOLDS.

Application filed August 22, 1925, Serial No. 51,822, and in Hungary September 11, 1924.

This invention relates to the process of producing inflatable bodies, as for example toys, of flat rubber plates without the use of molds.

In the manufacture of toys of so-called mineralized, comparatively heavy rubber plates, the production of the molds, their sculpture and chasing, is very expensive, and the cost of production is in addition greatly enhanced by the fact that this class of goods is made of particularly heavy rubber plates and that therefore the consumption of material is very considerable.

The production of inflatable hollow rubber bodies, without the use of molds, has also heretofore been accomplished by employing two unvulcanized rubber plates or sheets, one superposed on the other, and stamping out from both sheets simultaneously, by means of a suitably shaped and dulled die, the desired figure, the cut edges of the two sheets becoming welded and adhering to each other along the outline of the figure by the pressure of the die in the stamping-out operation.

While in the last-mentioned method of manufacture great savings are made by reason of the absence of molds, and by reason of the moderate consumption of material, only relatively flat hollow bodies arched to a somewhat lens shape upon inflation can be produced and consequently the variety of forms obtainable is very limited. Only primitive forms are obtainable and the parts of the body that are to spring out from the same must be subsequently attached by means of paste. Not only does such attachment of these parts, such as arms and legs of figures simulating human and animal forms, require an additional operation after the stamping and welding operations have completed the main body portion but it is a difficult matter to separately attach the extremities to the completed body portion in such a manner that upon inflation of the whole, the extremities will project from the main body portion in the desired and natural manner. Generally the result is an extreme and unnatural convergence or divergence of the opposite members of a pair of extremities, this being especially true of quadruped animal forms, the opposite legs of each pair either converging too much or spreading laterally from the main body portion in an unnatural manner, and in a maner which does not properly support the inflated form upon its feet.

According to another method, described in U. S. patent to Roberts 1,504,079, extremities situated at both sides of the median plane of an animal figure may be obtained by using a folded rubber-sheet insertion introduced between the two rubber sheets forming the lateral parts of the figure in the original formation of the article. This method is subject to the objections, however, that it greatly limits the shapes obtainable and involves the use of a plurality of doubled rubber-sheet insertions for a plurality of pairs of extremities in those cases where the folded edge of the insertions for the several pairs of extremities cannot be brought into the same straight line. Thus, for example, animal figures having legs and ears as extremities, when made according to the method described in the Roberts Patent 1,504,079, require a separate folded rubber-sheet insertion for the legs and a separate one for the ears.

The present invention relates to inflatable hollow rubber bodies with protruding extensions comprising two rubber sheets with doubled rubber sheet insertion between said first mentioned sheets to form the sides of the protruding extensions turned toward the median plane of the figure.

According to the present invention, the two lobes of the doubled insertion are united along a curvilinear fold, and are composed preferably of two separate sheets united by means of a curvilinear seam. Owing to this improvement, one single insertion, doubled along a curvilinear fold, can be extended to any desired length of the periphery of the hollow figure, even to its whole periphery, so that in that latter case the doubled insertion takes the shape of a bilobate flat ring. Thus, for example, a body in human form may be produced which would possess a face profile, a belly profile and a back profile, as well as legs and arms, so that by our improved process a more perfect reproduction of the natural form is obtained without material increase of the cost of production.

An important and distinguishing feature of one method of carrying out our invention is the stamping out of the profile of an intermediate body portion from two superposed plates in a manner to cause them to adhere along the profile, that is cut-seaming the two plates together along the profile line, then employing these joined plates as an insert between two plates, and stamp welding out the outer outline of the figure from all the superposed plates. When the stamping operation is completed and before inflation, the form thus produced presents two outer layers forming the flat sides of the figure in its deflated condition and the two inner layers of the insert united to the outer layers along a marginal edge of the outer layers and united together inwardly of that marginal edge along a line deviating from a straight edge according to the profile along which they were cut-seamed together.

The various features of novelty which characterize our invention are pointed out with particularity in the claims annexed to and forming a part of this specification; but for a better understanding of the invention, its advantages and specific objects attained with its use, reference should be had to the accompanying drawings and descriptive matter in which we have illustrated and described the best forms of our invention, and have shown them in comparison with known processes of making inflatable bodies. It is to be understood, however, that the examples to be described in the specification and shown in the drawings are merely illustrative of the invention, and that the broad scope of the invention is not restricted to the particular examples and details here presented.

Of the drawings:

Fig. 1 is a front elevation of an inflated rubber form made in accordance with one of the old methods hereinbefore referred to.

Figure 3:
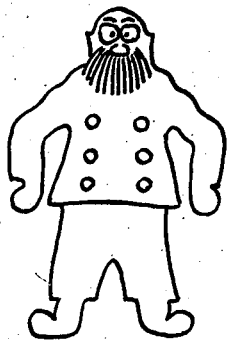
Fig. 3 is a front elevation of an inflated rubber form made in accordance with the process hereinbefore referred to as described in the U. S. patent to Roberts 1,504,079.
Figure 4:
Fig. 4 is a side elevation thereof.
Figure 6C:
Figure 6A:
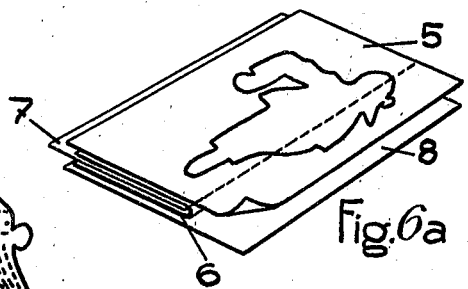
Figure 6B:
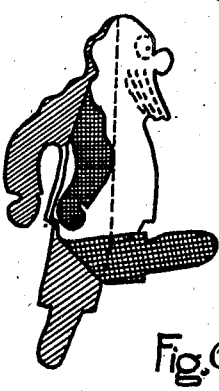

Fig. 6ª shows the manner of producing the form illustrated in Figs. 3 and 4 according to the process hereinbefore referred to as described in the Roberts U. S. Patent 1,504,079.

Fig. 6ᵇ shows the figure, in deflated condition, stamped out by following the process illustrated in Fig. 6ª.

Fig. 6ᶜ is a diagrammatic outline representation of a cross section of the stamped out figure following the process illustrated in Fig. 6ª.

Figs. 7 and 8 are front and side elevations, respectively, of a form made according to one example of our process.

Figs. 9ª and 9ᵇ illustrate the process according to this example.

Figure 10:
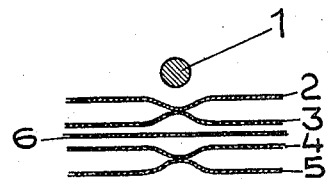

Fig. 10 shows diagrammatically the stamping operation and the character of die which may be employed in producing the forms illustrated in Figs. 7 and 8 by the process illustrated in Figs. 9ª and 9ᵇ.

Figure 11:
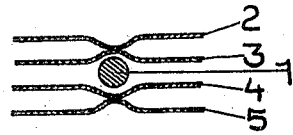

Fig. 11 is a view showing diagrammatically a simplication of the stamping process.

Figure 12:
Figure 13:

Figs. 12 and 13 are front and side elevations, respectively, of a second form produced by a modification of our process, employing the stamping operation diagrammatically shown in Fig. 11.

Figure 14:
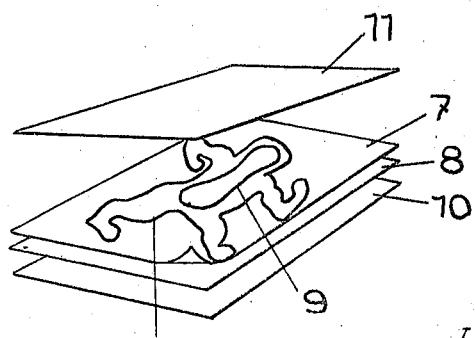
Figure 15:
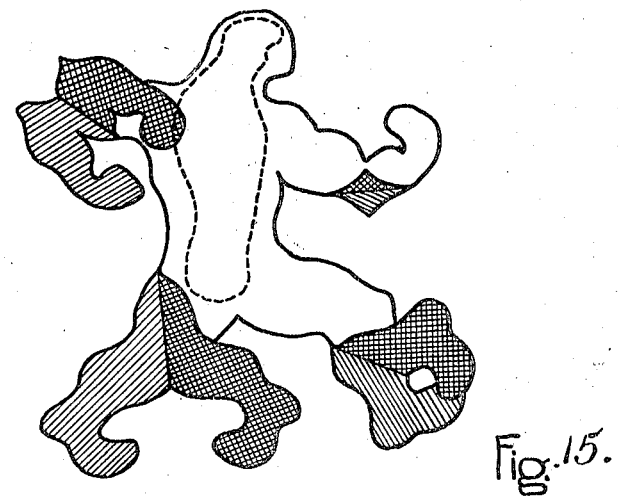
Figure 16:
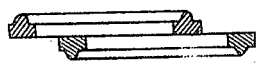

Figs. 14 and 15 show different steps in carrying out this third modification.

Figs. 16, 17, 18, and 19 illustrate various forms of construction of the dies which can be used in carrying out the process of this third modification.

Figure 1:
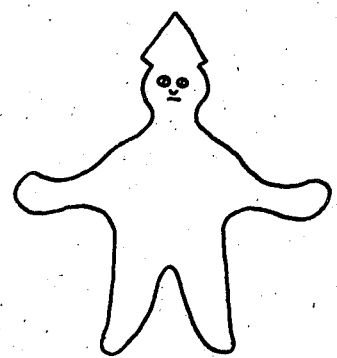
Figure 2:
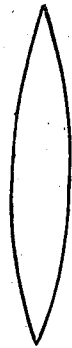
Fig. 2 is a side view thereof.
Figure 5:
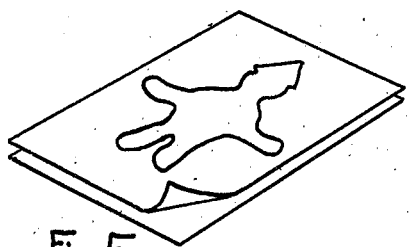
Fig. 5 shows the manner of producing the form shown in Figs. 1 and 2 by an old and known process.

In the drawings, attention is first directed to Figs. 1 and 2, and it is to be noted that in this illustration of a body formed by an old process, there are no laterally protruding parts, and the organs of the face have to be painted on. As shown in Fig. 5, the common manner of producing such a body of Figs. 1 and 2 has been to place two rubber plates with one superimposed on the other and then to stamp out of both plates simultaneously by means of a dull die, the desired figure, the cut edges of which two plates will adhere to one another. This is followed by outer and inner vulcanization of the body whereupon the formed body can be inflated.

The form shown in Figs. 3 and 4 can be made by various modifications of our process by the use of only three rubber plates.

Attention is next called to the forms illustrated in Figs. 3 and 4 to Figs. 6ª, 6ᵇ, and 6ᶜ illustrating the manner of producing these forms by the method heretofore referred to as described in the U. S. patent to Roberts 1,504,079. According to this method the crude rubber plate 8 is laid over a folded rubber plate 6, a sheet of paper 7 or the like being placed between the two folds. A third rubber plate 5 is now placed on top in the position shown in Fig. 6ª. The figure is then stamped out. Where the sheet of paper lies, the two parts of the folded rubber plate 6 will not adhere, and the two folds can therefore be unfolded and the sheet of paper can be removed, while plates 5 and 8, 5 and 6, and 6 and 8 adhere along the entire profile. That is to say, the outer single plates 5 and 8 are cut-seamed directly together and adhere along that potion of the profile shown in Fig. 6ª which is beyond the region of the doubled insert plate 6, while along the remaining portions of the profile, in the region of the four layers of the sheet material, the outer layer on each side is cut-seamed or stamp welded to the adjacent inner layer along this outline. Figs. 6ᵇ and 6ᶜ show the stamped-out figure partly unfolded on the point where the sheet of paper 7 has been placed between the two folds of the rubber plate 6.

Attention is called to the fact that in the form shown in Figs. 3 and 4, as made by the method illustrated in Figs. 6ᵃ, 6ᵇ and 6ᶜ, which method has heretofore been referred to as described in the U. S. patent to Roberts 1,504,079, the limbs produced by means of the folded insertion do not stand in substantially parallel planes. In contrast with this, attention is called to the general distinguishing characteristic of the new forms of our invention, illustrated in Figs. 7, 8, 12 and 13, of the spacing apart in substantially parallel planes of the opposite legs of each pair in the animal and human forms shown, so that the legs present extensions in a natural manner from the main body of the form, without an unnatural outward spreading of the legs laterally from the body of the form. This and other distinguishing characteristics of the new forms are the result of features of our process or method which will be more fully hereinafter set forth.

While the procedure illustrated in Figs. 6ᵃ, 6ᵇ, 6ᶜ, is adapted for the production of forms of the general type of that shown in Figs. 3 and 4, it has certain disadvantages in the production of other forms, especially of quadruped animals. The completed form made by the procedure illustrated in Fig. 6ᵃ, before inflation, presents two outer sides of the contour indicated on the sheets of Fig. 6ᵃ and shown in Fig. 6ᵇ, and an insert piece lying between the outer sides, which insert piece is made up of two layers flatly folded in the deflated condition of the article, with the line of fold or union between the layers on a straight line, indicated by the dotted line in Figs. 6ᵃ, 6ᵇ. When the procedure illustrated in Fig. 6ᵃ is followed in the making of other types of forms than those shown in Figs. 1, 2, 3 and 4, and especially quadruped animal forms, the folded insert piece with its straight line of fold appears in the completed form before inflation in the body region between the legs. As a result of the straight union or fold of the two layers of the insert piece, positioned inwardly of the marginal edges of the body sides in the deflated condition of the form, an inflation of the form causes an excessive spreading of the limbs on the opposite sides of the median line of the insert piece, which spreading presents a distortion from the natural form desired.

Hence an important feature of our invention is the modification of the procedure illustrated in Fig. 6ᵃ avoiding the defect mentioned and adapting the process to the production of new forms of the general type of Figs. 7 and 8 in which opposite limbs of each pair are spaced apart transversely of the main body portion and extend from the body in a natural manner without excessive spread, and in a manner to properly support the form upon its feet. The characteristic of such new forms, in their completed condition before inflation and flat folded along their seams, (and which characteristic avoids the hereinbefore mentioned defect upon inflation of the form), may be defined as a union of the two layers or leaves of the insert piece along a curvilinear fold, and preferably with the insert piece composed of two separate sheets united by a curvilinear marginal seam, and with the marginal seam or fold preferably also on an outline representing a natural contour or profile of that particular body region which is occupied by the insert upon inflation of the form to its shape representative of the animal. Such a curved marginal seam uniting the two layers, leaves or sheets of the insert piece is shown in full lines in Fig. 9ᵃ and in dotted lines in Fig. 9ᵇ, which figures illustrate one example of the process.

Referring now more in detail to the method or process illustrated in Figs. 9ᵃ and 9ᵇ of making the forms shown in Figs. 7 and 8; first the two rubber plates 9 and 10 are superposed and the belly profile and the neck profile 11 of the elephant is died out (Fig. 9ᵃ). The lined or shaded portion in Fig. 9ᵃ represents the adhering portions of the two plates which are to be retained to form the insert piece, the unshaded portion on the opposite side of the curved line 11 represents the waste. Then, as shown in Fig. 9ᵇ the adhering portions of the stamped plates 9 and 10 are laid between the two rubber plates 12 and 13, a piece of paper 14 being placed between rubber plates 9 and 10, on which the line of profile 11 has previously been stamped out. As the next step the entire profile is stamped with the exception of the belly and neck profiles which have been cut in the preceding operation, and the result is the form of Figs. 7 and 8. In other words, the two-part insert piece is stamp welded, or cut-seamed to the side pieces 12 and 14 in Fig. 9ᵇ exactly as the one-piece folded insert piece 6 is cut-seamed to the outer side pieces 5 and 8 in Fig. 6ᵃ. In the example of the process illustrated by Figs. 9ᵃ and 9ᵇ, because of the employment of two individual plates or sheets for the insert piece, cut seamed together, it is possible to give any desired or required curve to the marginal-joining seam of the two flaps of the insert piece, thus avoiding the straight joining edge of the two flaps of the folded insert piece shown in Fig. 6ᵃ, and thus avoiding the distortion of limb members from their true form, upon inflation of the body which occurs in the use of the folded insert piece in the production of certain forms, as hereinbefore stated. A further advantage of the two-part insert piece with marginal curvilinear connecting seam over the straight-line folded insert piece is the possibility of extending the former along as great a portion of the body outline as desired by the proper outline of the joining seam while the latter can be extended only to relatively short and approximately straight sections of the outline of the body if extreme distortion of the character referred to is to be avoided upon inflation of the completed form. The inner and outer vulcanization of this type of complicated, inflatable forms may be effected by the use of a predetermined quantity of air saturated with sulphurous chloride or of an indifferent gas and then external vulcanization is effected in the known manner. It is well known that the inner vulcanization can take place simultaneously and in perfect manner.

The process described above can be materially simplified by avoiding the use of the paper sheets or the like between the rubber plates that are not to be welded. This can be effected by insuring that during the stamping process the die is not allowed to act from the one external side of the superposed rubber plates, but is placed where according to the processes above detailed, the paper sheet is inserted, that is, between the two rubber plates that are not to be welded, so that the element separating the rubber plates is formed by the die itself. The former process, with the paper separating the rubber plates, is shown in Fig. 10, while the latter process is shown in Fig. 11. In both figures, 1 represents the die, 2, 3 and 4, 5 the rubber plates to be welded, while the adhering of the welded pairs of plates 2, 3 and 4, 5 is in Fig. 10 prevented by the sheet of paper, and in Fig. 11 by the die. For the stamping, when separating paper is not used, the rubber plates are placed together with the die arranged in accordance with Fig. 11 between smooth pressure plates and pressed.

This new process of stamp welding and other improvements forming the subject matter of this invention greatly facilitate the production of complicated profiled forms, as shown by way of example in Figs. 12 to 15.

In the human figure illustrated in front and side views in Figs. 12 and 13 respectively, the upper as well as the lower extremities are positioned in different planes, and head, face, neck, back and chest are profiled.

In achieving this result, several steps are necessary. To obtain the material needed to form these profiles, a closed line 9, corresponding to the form to be made, is stamped out of two superposed rubber plates 7 and 8 under simultaneous welding of the same in accordance with Fig. 14, the two rubber plates adhering to one another on this line, whereupon the waste within this line is removed. Now the rubber plate 7, 8 which has been welded on line 9 is placed on a third rubber plate 10, the die (not shown) having the outline of 12 is placed between the rubber plates 7, 8 and a fourth plate 11 is laid over plates 7, 8, 10. This assembled unit is then pressed between two smooth, plain plates, resulting in the production of the form shown in Fig. 15, which, however, has four extremities instead of two. To remove the superfluous members, they are cut off by means of dies, during which the two rubber plates are welded. On one side the right extremities are removed and on the other side the left extremities are removed, and the form is then vulcanized. When inflated, we obtain the form illustrated in Figs. 12 and 13. It is understood that any other desired forms may be produced in a similar manner.

It will be seen that the last described procedure is in general principles a modification of the process illustrated in Figs. 9ᵃ, 9ᵇ. One distinguishing feature of the modified procedure is the extension of the inner marginal seam of the two-part insert piece in a closed curvilinear outline, so that the insert piece, in the completed form, extends between the outer side pieces throughout the entire outline of the main body portion. Also, in the inflated condition of the form, the middle seam of the two-part insert piece which joins the two parts together defines in its entire closed outline the medium plane or plane of symmetry of the body.

Another distinguishing feature to be noted in the example of the invention illustrated in Figs. 14 and 15 is the variations in width of the two-part insert piece at different parts along the outline of the completed form, measured from the inner marginal seam uniting the two parts of the insert, indicated by the full outline 9 in Fig. 14 and by the dotted outline in Fig. 15, to the outer marginal seams uniting the insert to the outer side sheets of the figure, indicated by the full outline 12 in Fig. 14 and by the outer edge line of the figure in Fig. 15. This variation in width, produced of course in the illustrated example by the cooperative relation of the outlines 9 and 12 (Fig. 14) along which the stamp-welding cuts are formed, is an important factor in producing the desired surface contours in the completed form when inflated. In the region of those portions of the form where no projections, such for example as arms, legs, ears, etc. of the animal form, are to stand out from the inflated body of the form, the insert piece should be of less width than in the regions from which those extremities arise. Also by a gradual variation in width along properly curved marginal seam outlines in both the side pieces and the insert piece of the form, graceful contours of different body portions are produced in the form when inflated, simulating the natural form of the human or animal represented. Certain delicate profiling, such for example as for the face region in a form simulating the human, may result in such reduction in the completed figure of the width of the particular portion of the two part insert piece lying in that region as to bring the seam joining its two parts very close to the marginal seams.

It is also essential, in order to produce a form which when inflated shall have the shape of animal or human figures, that is to say, a body having extensions appearing in a natural manner on opposite sides of the median plane of plane of symmetry of the body, with inwardly curved contour of the body surfaces therebetween and differently curved contours in other body regions, that the ring-like insert piece be of such variations in width along its circumference as to dispose the central seam of this two-part insert piece within the profile presented by the marginal seams uniting the insert piece to the side pieces in the region of the extensions referred to and on an even profile with or outwardly of the profile of the marginal seams in other body regions such as the back and belly of the representative form when inflated.

This will more clearly appear from reference again to Figs. 12 to 15 inclusive.

In Fig. 14, the line along which the side pieces and the insert piece are to be cut-seamed together is indicated by the numeral 12 and it is shown as of varying approach to the central seam 9 of the two part insert piece. This variation is also shown in Fig. 15, the dotted line indicating the central seam of the two-part insert piece and the free marginal edges of the figure indicating the marginal seams. When the form is inflated from the flat condition of Fig. 15 to the condition shown in Figs. 12 and 13, the insert layers bulge outwardly in certain body regions, such as along its back and belly, to an extent disposing, in some of these regions, the central seam of the insert pieces on an even presentation with the marginal seams, that is to substantially the same profile level as the inflated form is viewed by the observer, while in other of these regions the central seam is presented outwardly beyond the profile of the marginal seams in accordance with the form of curve of the seams and the variations in width of the insert piece. Also in the body regions intermediate the legs, where, as shown in Figs. 14 and 15, the insert piece is of greatest width but also of sharpest curvature of its central profile seam, the insert piece retains its inward contour to a degree disposing its central seam inwardly of the marginal seam upon inflation of the form.

It will be seen that in the above described process, in producing the form shown in Figs. 12 and 13, the superfluous parts shown in Fig. 15 must be separately removed after the stamping process. However, this operation can be avoided by providing that in place of the die described in connection with Fig. 14 and working in upward and downward direction, two dies are placed between the two plates 7, 8, the cutting side of one die working upward, forming the extremities on one side, and the cutting edge of the second die working in downward direction and forming the extremities on the other side, as shown in diagram in Fig. 16. This stamping between two separate dies produces only two extremities.

Figure 17:

In place of the two dies, two steel plates may be used, the cutting edge of one being arranged in upward and that of the other in downward direction as shown in section in Fig. 17. The result is the same, but the two steel plates can be fitted together with greater ease and convenience than the dies of Fig. 16.

Figure 18:
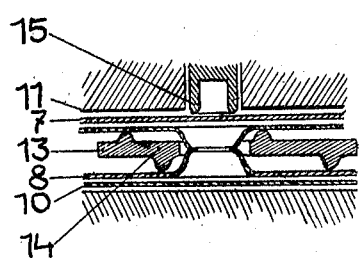

The purpose sought to be attained can be reached with greatest simplicity by the use of a single die 13 which is placed between the rubber plates 7, 8. The cutting edges of this die, conforming to the outlines of the form to be stamped out, lie partly on top and partly on the bottom, as shown in Fig. 18. Also the die, provided with a recess 14 corresponding to the inner periphery, cooperates with a stamp 15 corresponding to the contour 9, (Fig. 14) in welding the plates 7, 8 together along the line 9, and this step takes place before the rubber plates 10 and 11 are placed in their respective positions.

Figure 19:
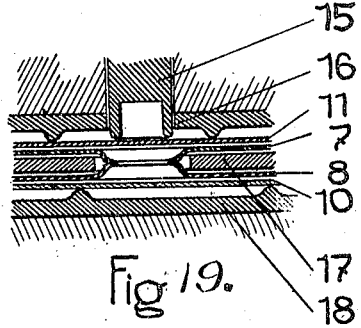

Another modification of the stamping process is shown in Fig. 19. Instead of the process just described, in which a single die works from the middle in upward and downward direction, as in Fig. 18, we provide a pair of dies 16 and 18, the element 16 working from the top, the other element 18 working from the bottom, and a rigid plate 17 being placed between the rubber plates 7, 8 to act as a female die. On the upper cutting die 16 a recess or groove may be provided corresponding to outline 9 (Fig. 14), and this recess permits the die 15 to cut the plates along the line 9 and weld these plates 7, 8 together along this line 9, and this takes place before the rubber plates 10 and 11 are placed in position. In this way the two stamping operations are rapidly performed, and the entire process is carried out accurately and quickly, without the necessity of making time-consuming adjustment of the parts.

These stamping operations are particularly adapted for mass production of hollow inflatable rubber bodies whether of the more simple forms or of the more complicated forms simulating the human and animal forms. It is also to be observed that in employing in the process stamping and welding means, in the manner illustrated in Figs. 18 and 19, with one tool portion of such means inserted between the intermediate rubber layers during the operation of cut seaming each of such intermediate layers to an adjacent outer layer, that the insert tool portion, while taking part in the stamping and welding operation also at the same time separates the intermediate layers, thus performing the additional function of the paper or the like separator.

While in accordance with the provisions of the statutes we have illustrated and described the best embodiments of our invention now known to us, it will be apparent to those skilled in the art that changes may be made in the subject matter and form of the invention disclosed without departing from the spirit of our invention as set forth in the appended claims, and that in some cases certain features of our invention may be used to advantage, without a corresponding use of other features.

We claim:

1. The process of producing from unvulcanized rubber sheet material hollow inflatable bodies having a plurality of profiles comprising stamping out one of the profiles from two superposed individual sheets of the material in a manner to produce a marginal seam uniting said sheets along said line of stamping, positioning the portions of said sheets containing said profile and marginal seam in surface contact with like sheet material and stamping out from all of the contacting layers of material another profile of said body in a manner to complete the seams forming a closed body.

2. The process set forth in claim 1 and in which the first formed profile and seam are intersected in two places by the second formed profile and seam.

3. The process set forth in claim 1 and in which the second formed profile and seam present a closed outline forming the marginal outer edge of the completed body form before inflation.

4. The process of producing from unvulcanized rubber sheet material hollow inflatable bodies having a plurality of profiles comprising cut-seaming one portion of one individual sheet of the material to one portion of a second individual sheet of the material along a curvilinear line to form one of the profiles lying in a median plane of the body when inflated, and cut-seaming the separate layers of the two adhering sheets containing said profile to like sheet material along an outline constituting another profile and completing the seams forming a closed body.

5. The process of producing from unvulcanized rubber sheet material hollow inflatable bodies simulating limbed animals comprising cut-seaming one portion of one individual sheet of the material to one portion of a second individual sheet of the material along a curvilinear line to form along the seam a curved or profiled body portion intermediate opposite limbs of a pair and cut seaming the separate layers of the two adhering sheets to like sheet material to form the limbs and complete said body.

6. The process of producing an inflatable hollow body having a plurality of profiles, comprising stamping one of the profiles out of two superposed rubber plates and uniting them along the line of stamping, inserting said united plates bearing said profile between two superposed rubber plates and then stamping out from said rubber plates the entire marginal outline of the uninflated body.

7. The process of producing from unvulcanized rubber sheet material hollow inflatable bodies having a plurality of profiles comprising uniting portions of a plurality of superposed layers of the material by a plurality of marginal seams, one between two adjacent intermediate layers along a curved line as a profile of an intermediate body portion, another between one of said intermediate layers and an adjacent outer layer on one side and another between the other of said intermediate layers and an adjacent outer layer on the other side.

8. The process of producing hollow inflatable forms from unvulcanized sheet rubber material comprising cut-seaming two superposed sheets together along a curvilinear line, inserting said joined sheets between two other sheets, cutting through all of said sheets along an outline which crosses the connection between said first two sheets at two separated points while leaving intact that portion of said curvilinear line of connection between said points and at the same time forming marginal seams between each outer sheet and the sheet adjacent thereto along said cut.

9. The process of producing hollow inflatable toys simulating human and animal forms, comprising stamping out from two sheets of raw rubber a curved profile of a body portion intermediate the limbs by means of a welding stamp forming a seam uniting the sheets along the line of stamping, employing the united stamped out portions of said sheets as a double layer insert piece between two raw rubber sheets and stamp welding out the marginal outline of the form from the superposed layers in a manner to present the completed form before inflation as consisting of two outer opposite side pieces with their marginal edges conforming to the side outline contour of the animal represented and the two-part insert piece with marginal seams uniting its parts with the outer side pieces through the limb portions of said side outline and with the curvilinear center seam of said insert piece positioned inwardly between said limbs.

10. The process of making hollow bodies by the cutting in pairs and welding together of unvulcanized, weldable rubber sheets, comprising the formation of a pile of the rubber sheets in four layers and stamp welding each of the inner layers to its adjacent outer layer along a desired profile while maintaining said inner layers separated during the stamping and welding operation by placing between said inner layers a cutting and welding die means having opposed effective tool edges in the form of said desired profile and applying pressure to said pile in a manner to stamp weld each of said inner layers to its adjacent outer layer along said profile.

11. The process of making hollow bodies by the stamping out in pairs and welding together of unvulcanized, weldable rubber sheets by means of a stamping cutter and welding means, characterized by the formation of a pile of the rubber sheets having two intermediate and two outer layers and performing the stamping out and welding operation by two tools as cooperating parts of said stamping cutter and welding means employed on opposite sides of said pile to move in opposite directions thereagainst and opposing tool means constituting the complementary portion of said stamping cutter and welding means placed between said two intermediate layers of said pile and having opposite effective surfaces cooperating with said first tools in the stamping out and welding operation while separating said intermediate layers during said operation.

12. The process of producing hollow bodies from unvulcanized weldable sheet rubber comprising inserting two superposed layers of sheet rubber, united along one marginal edge, between two outer layers of sheet rubber and stamp welding each of the layers of the insert to the adjacent outer layer along a desired profile while maintaining said inner layers separated except along their said uniting edge by placing between said inner layers a wire welding die in the form of the desired profile and applying pressure in a manner to stamp weld each of said inner layers to the adjacent outer layer along said profile.

13. An inflatable form of sheet rubber representative of an object having limbs projecting from the main body portion of said form, comprising a plurality of layers of rubber having regional areas united by marginal seams forming a portion of the body and the limbs, and other regional areas united by a curvilinear seam intermediate the limbs forming a profiled portion of the body intermediate the limbs.

14. A sheet rubber toy representative of an animal form having legs side by side comprising two layers of rubber joined together by marginal seams to make the body and forming outer sides of the legs, and intermediate layers of materially less area joined to the outer layers along marginal seams completing the legs and joined together by a curvilinear seam intermediate said legs forming a profiled body portion intermediate said legs.

15. An inflatable rubber body consisting of two outer profiled sheets and two intermediate profiled sheets so united along profiled edges that in the uninflated, flat condition of the body folded along the seams, all the sheets lie in superposed position in parallel planes, with the parts lying between the outermost sheets united together by a seam deviating from a straight line.

16. An inflatable rubber body consisting of two outer layers of sheet rubber and intermediate layers connected thereto, the intermediate layers being united along a curved line.

17. An inflatable form of sheet rubber comprising two outer layers of rubber and intermediate layers, said intermediate layers being united by a curved seam.

18. An inflatable rubber body as specified in claim 17 in which the body or form is a rubber toy representative of an animal having legs projecting from a body portion and in which said curved seam extends between the legs.

19. An inflatable form of sheet rubber comprising a plurality of layers of sheet rubber joined along marginal lines of the uninflated form, said plurality of layers including two outer layers presenting flat sides of the uninflated form and a bilobate doubled insertion between said outer layers the line of fold between the two lobes of which is curvilinear in the uninflated form.

20. An inflatable form of sheet rubber comprising a plurality of sheets of rubber having joining seams, said plurality of sheets including two outer sheets presenting flat sides of the uninflated form and a bilobate doubled insertion between said outer sheets consisting of two sheets united by a curvilinear seam forming the line of fold of the two lobes of the insertion in the uninflated condition of the form.

21. An inflatable form of sheet rubber as specified in claim 20 in which the two sheets forming the bilobate doubled insertion are united along the curvilinear seam by stamp welding.

22. An inflatable form of sheet rubber consisting of a plurality of sheets of rubber having joining seams, said plurality of sheets including two outersheets forming flat sides of the uninflated form and a single bilobate insertion between said outer sheets the two lobes of which are united by a curvilinear seam, said outer sheets and said single insertion together completing said form.

23. The process of making hollow bodies by the cutting in pairs and welding together of portions of unvulcanized, weldable rubber sheet material, comprising the formation of a pile of the rubber sheet material in four layers and stamp welding each of the inner layers to its adjacent outer layer along a desired profile while maintaining said inner layers separated to avoid their being stamp cut and welded together during the stamping and welding operation by a wire stamping and welding die in the form of the desired profile and applying pressure in a manner to stamp weld each of said inner layers to the adjacent outer layer along said profile.

LAJOS DOROGI.
ISTVAN DOROGI.